Figure 1:
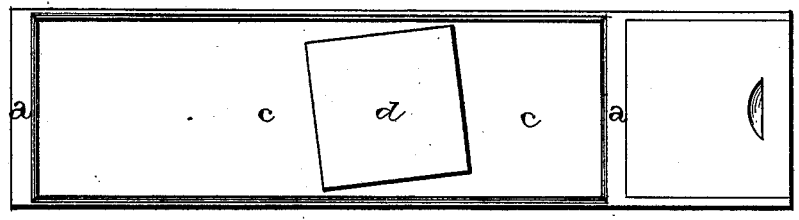
Figure 2:

J. A. NOBER.
HONES.

No. 195,384. Patented Sept. 18, 1877.

WITNESSES.
J. Wm. Garner
Will H. Kern.

INVENTOR.
J. A. Nober,
per
F. A. Lehmann,
Atty.

UNITED STATES PATENT OFFICE.

JULIUS A. NOBER, OF PARKER CITY, PENNSYLVANIA.

IMPROVEMENT IN HONES.

Specification forming part of Letters Patent No. 195,384, dated September 18, 1877; application filed August 28, 1877.

*To all whom it may concern:*

Be it known that I, JULIUS A. NOBER, of Parker City, in the county of Armstrong and State of Pennsylvania, have invented certain new and useful Improvements in Hones; and I do hereby declare the following to be a full, clear, and exact description of the invention, such as will enable others skilled in the art to which it pertains to make and use it, reference being had to the accompanying drawings, which form part of this specification.

My invention relates to an improvement in hones; and it consists in the use of a plate of glass, and soap-stone rubbed thereon so as to form a lather for sharpening razors and other sharp-edged instruments, as will be more fully described hereinafter.

The accompanying drawings represent my invention.

$a$ represents a suitable block, of wood or other material, which forms the base of my hone. Upon the top of this base, secured in any suitable manner, is a plate of glass, $c$, of such a thickness that its upper surface will project a convenient distance above the top of the base $a$. This glass should be of considerable strength, very smooth, and placed so evenly upon the base that every part will be evenly supported in position.

In order to render the hone thus formed ready for use in sharpening razors and other such sharp-edged instruments, I take a piece of soap-stone, $d$, and some water, and rub the stone upon the glass until a good thick lather is formed. The hone thus lathered is ready for use, and will be found to give to razors and other instruments sharpened thereon a very smooth, sharp, and even edge.

Owing to the extreme smoothness of the glass, a wire-edge can never be formed upon the razor, however long it may be honed, so that after it has been honed upon this glass surface there is no need of a leather strap or hone, or any other such device, to take away the wire-edge that is always formed when the razor is honed upon steel, stone, or other such hard substances. Glass being so smooth and hard, is almost indestructible itself, and possesses a quality of sharpening steel instruments to a degree not possessed by other substances.

In one end of the base $a$ is made a small recess, $d$, in which the block of soap-stone $e$ for making a lather upon the hone is kept.

I am aware that glass has been used in connection with the sharpening of cutlery and for polishing the same, and this I disclaim.

My invention consists in the discovery of the use of soap-stone in connection with a glass base, which soap-stone not only forms a lather, but furnishes just enough grit to make the razor catch hold.

Having thus described my invention, I claim—

In a hone or an abrading instrument, a glass plate coated with a solution of soap-stone and water, as and for the purposes set forth.

In testimony that I claim the foregoing I have hereunto set my hand this 24th day of August, 1877.

JULIUS AUGUST NOBER.

Witnesses:
G. W. WARD,
G. HODY.